US010875789B2

(12) United States Patent
Taarning et al.

(10) Patent No.: US 10,875,789 B2
(45) Date of Patent: Dec. 29, 2020

(54) PROCESS FOR REMOVING SULPHUR COMPOUNDS FROM PROCESS STREAMS

(71) Applicant: HALDOR TOPSOE A/S, Kgs. Lyngby (DK)

(72) Inventors: Esben Taarning, Frederiksberg (DK); Christian Mårup Osmundsen, Gentofte (DK)

(73) Assignee: HALDOR TOPSØE A/S, Kgs. Lyngby (DK)

(*) Notice: Subject to any disclaimer, the term of this patent is extended or adjusted under 35 U.S.C. 154(b) by 477 days.

(21) Appl. No.: 15/768,302

(22) PCT Filed: Oct. 14, 2016

(86) PCT No.: PCT/EP2016/074745
§ 371 (c)(1),
(2) Date: Apr. 13, 2018

(87) PCT Pub. No.: WO2017/064267
PCT Pub. Date: Apr. 20, 2017

(65) Prior Publication Data
US 2018/0312410 A1 Nov. 1, 2018

(30) Foreign Application Priority Data
Oct. 14, 2015 (DK) .................................. 2015 00633

(51) Int. Cl.
B01D 19/00 (2006.01)
B01D 53/52 (2006.01)
C02F 1/20 (2006.01)
C10G 21/06 (2006.01)
C10G 29/24 (2006.01)
C02F 101/10 (2006.01)

(52) U.S. Cl.
CPC ............ C02F 1/20 (2013.01); B01D 19/0005 (2013.01); B01D 53/52 (2013.01); C10G 21/06 (2013.01); C10G 29/24 (2013.01); C02F 2101/101 (2013.01)

(58) Field of Classification Search
CPC ....... B01D 19/0005; B01D 53/52; C02F 1/20; C02F 2101/101; C10G 21/06; C10G 29/24
See application file for complete search history.

(56) References Cited

U.S. PATENT DOCUMENTS

| 2,426,318 | A | | 8/1947 | Menaul |
| 4,680,127 | A | | 7/1987 | Edmondson |
| 4,909,925 | A | | 3/1990 | Hodgson et al. |
| 5,223,175 | A | * | 6/1993 | Mabire ............ B01D 17/0202 516/29 |
| 5,284,635 | A | | 2/1994 | Mabire |
| 2002/0157989 | A1 | | 10/2002 | Gatlin et al. |
| 2004/0022912 | A1 | | 2/2004 | Majerski et al. |
| 2009/0126433 | A1 | | 5/2009 | Piskorz et al. |
| 2011/0147272 | A1 | | 6/2011 | Karas et al. |
| 2016/0002137 | A1 | | 1/2016 | Taarning et al. |

FOREIGN PATENT DOCUMENTS

| GB | 2185994 A | 8/1987 |
| GB | 2495399 A | 4/2013 |
| WO | WO 2014/131743 A1 | 9/2014 |

OTHER PUBLICATIONS

International Search Report (PCT/ISA/210) dated Dec. 20, 2016, by the European Patent Office as the International Searching Authority for International Application No. PCT/EP2016/074745.
Written Opinion (PCT/ISA/237) dated Dec. 20, 2016, by the European Patent Office as the International Searching Authority for International Application No. PCT/EP2016/074745.
Danish Search Report dated May 10, 2016 and, issued by the Danish Patent and Trademark Office in the corresponding Danish Patent Application No. PA 2015 00633. (4 pages).
Written Opinion of the International Preliminary Examining Authority (PCT Rule 66) (PCT/IPEA/408) dated Nov. 21, 2017, by the European Patent Office as the International Searching Authority for International Application No. PCT/EP2016/074745. (7 pages).

* cited by examiner

Primary Examiner — Cabrena Holecek
(74) Attorney, Agent, or Firm — Buchanan Ingersoll & Rooney P.C.

(57) ABSTRACT

A method for removing sulphur compounds from a process stream by contacting the process stream with an aqueous solution containing glycolaldehyde as the predominant compound.

23 Claims, No Drawings

PROCESS FOR REMOVING SULPHUR COMPOUNDS FROM PROCESS STREAMS

The present invention relates to a method for removing sulfur compounds, especially hydrogen sulfide ($H_2S$), from process streams by contacting the process stream with a $H_2S$ scavenger containing predominantly glycolaldehyde, particularly with an aqueous solution in which 10-90 wt % dry matter is glycolaldehyde. More particularly the aqueous solution is an oxygenate mixture containing glycolaldehyde, glyoxal, acetol, optionally formaldehyde and optionally methylglyoxal (pyruvaldehyde), and in which glycolaldehyde is present in a weight amount 3-20 times higher than glyoxal. The invention relates also to a method for producing the aqueous solution and its uses/applications.

Hydrogen sulfide ($H_2S$) is a highly toxic chemical, which additionally is highly corrosive and a catalyst poison. Thus, in industries such as the oil and gas industry or the paper industry, the removal of hydrogen sulfide from process streams is a requirement due to safety considerations, and to avoid damage to equipment. For large scale removal of hydrogen sulfide, absorption towers employing regenerative hydrogen sulfide scavengers can be employed, however these are not a viable option at smaller scale. Instead, non-regenerative scavengers can be used, typically as aqueous solutions injected at the desired point in the production line. The most commonly used scavengers in the oil and gas industry are triazine compounds. These compounds are however costly, highly toxic, and unstable at pH values low.

An alternative to the triazine type compounds are aldehydes, such as formaldehyde, glutaraldehyde, acrolein, and glyoxal.

U.S. Pat. No. 4,680,127 discloses the use of a mixture of glyoxal with formaldehyde or glutaraldehyde to reduce the amount of hydrogen sulfide from aqueous solutions. There is no disclosure of glycolaldehyde as the predominant compound in an oxygenate mixture for $H_2S$ removal.

U.S. Pat. No. 5,284,635 discloses a process for the removal of hydrogen sulfide in a crude oil composition by treating the composition with a water-in-oil emulsion containing 20-80% of a dispersed aqueous phase, and 80-20% of a continuous oil phase. The dispersed aqueous phase contains aldehydes chosen from the group of formaldehyde, glyoxal, glutaraldehyde, glycolaldehyde or glyoxylic acid. Thus, an emulsion is required and there is no disclosure of glycolaldehyde as the predominant compound in an oxygenate mixture for $H_2S$ removal.

GB 2,495,399 discloses the use of the aldehydes glyoxal, acrolein, glutaraldehyde, formaldehyde and combinations thereof for removal of $H_2S$, i.e. as $H_2S$ scavenger. The aldehydes are corrosive to metals like steel, iron, aluminium, and thus require also the use of corrosion inhibitors. There is no disclosure of using glycolaldehyde to remove $H_2S$.

It is also well-known that glycolaldehyde is a much more expensive chemical than glyoxal.

It is an object of the present invention to provide a non-regenerative method for removing sulfur compounds from process streams.

It is another object of the present invention to provide a method for removing sulfur compounds from process streams which is simpler and thereby more inexpensive than prior art processes.

These and other objects are solved by the present invention.

We have now found that glycolaldehyde, a completely harmless substance, has an ability to remove hydrogen sulfide at least analogous to glyoxal. It would have been expected that the potential to remove $H_2S$ is associated to the toxicity of the aldehyde, since for instance glyoxal and formaldehyde are known to remove $H_2S$ yet they are toxic. It has now been found that the non-toxic glycolaldehyde removes $H_2S$.

Accordingly, in a first aspect of the invention there is provided a method for removing sulfur compounds from a process stream by contacting the process stream with an aqueous solution in which 10-100 wt % of the organic dry matter content is glycolaldehyde, for instance 30-100 wt %, 30-99% or 30-95%. In a particular embodiment, 50-99 or 50-95 wt % of the organic dry matter content is glycolaldehyde. Preferably 60-90 or 60-80 wt % of the organic dry matter content is glycolaldehyde.

By the invention, not only a simpler alternative to glyoxal as sulfur scavenger is provided, but also a scavenger which is non-toxic. Glyoxal is known to be acutely toxic upon inhalation and it is suspected of causing genetic defects. Furthermore, the invention may provide a non-regenerative solution to sulfur removal, particularly $H_2S$ removal, since upon treatment of the process stream with the aqueous solution of the invention, there seems to be no production of solid phase products and a rapid, non-reversible binding with $H_2S$.

According to an embodiment of the present invention, the aqueous solution of the invention does not contain oil or emulsifying agent as for instance disclosed in U.S. Pat. No. 5,284,635 nor corrosion inhibitors as for instance disclosed in GB 2,495,399. Glycolaldehyde is soluble in water. Using water as solvent or main solvent for the sulfur scavenger, is another aspect which makes the sulfur scavenger according to the present invention more environmentally friendly than the prior art. The water may be plain water, sea water or purified water. As used herein, the term "aqueous solution" is meant to refer to a solution comprising glycolaldehyde mixed with water and possibly some other mainly water miscible components such as methanol, ethanol, pyruvaldehyde, acetol, glyoxal and/or formaldehyde.

The rest of the organic dry matter content (apart from glycolaldehyde) may include compounds such as glyoxal, pyruvaldehyde, formaldehyde, acetic acid and acetol, in particular glyoxal. Accordingly, in a particular embodiment in connection with any of the above or below embodiments, the aqueous solution is in an oxygenate mixture also containing glyoxal and acetol, and in which glycolaldehyde is present in a weight amount of 2-40 times higher than glyoxal, suitably 3-20 times higher than glyoxal. Thus, the predominant non-water component of the oxygenate mixture is glycolaldehyde. Suitably, the glycolaldehyde is present in a weight amount of 10-15 times higher than glyoxal. The glyoxal will then only be a minor impurity, thus making the aqueous solution (oxygenate mixture) much safer, i.e. non-toxic and thereby easier to handle. This enables also to use the aqueous solution of the present invention as sulfur scavenger to prevent spillages causing exposure of personal and marine wildlife.

Preferably also glycoaldehyde is 10-95 wt % of the aldehydes in the aqueous solution, for instance 30-95 wt %, or 50-90 wt %.

As used herein, the weight amounts are based on organic dry matter, i.e. without including water.

The aqueous solution may also contain small amounts of formaldehyde, which may be removed by known methods as for instance disclosed in WO2014/131743. It is sometimes desirable to remove formaldehyde as formaldehyde may produce solid products which need to be removed when reacting with hydrogen sulfide. More specifically, formaldehyde produces solid products which can cause fouling of equipment and can re-release $H_2S$ upon pH changes (which thus constitute a significant health hazard) unless used together with $SO_3^{2-}$. Therefore, in another embodiment of the invention in convection with any of the above or below embodiments, the aqueous solution is free of formaldehyde.

The presence of formaldehyde in the aqueous solution may however be tolerated if present in small amounts. Accordingly, in yet another embodiment in connection with any of the above or below embodiments, 0-25 wt %, such as 0-10 wt % or 0.5-5 wt % of the organic dry matter content of the aqueous solution is formaldehyde. In such embodiments, glycolaldehyde may be present in a weight amount of 1.5-15 times higher than formaldehyde. In particular, the glycolaldehyde may be present in a weight amount of 5-12, preferably 8-12, for instance at least 10 times higher than formaldehyde.

The aqueous solution may also contain pyruvaldehyde (methylglyoxal) which may serve as sulfur scavenger. Accordingly, in yet another embodiment according to the present invention, in connection with any of the above or below embodiments, 0-40 wt %, such as 1-30 wt %, 2-25 wt % or 5-25 wt % of the organic dry matter content of the aqueous solution is pyruvaldehyde. Suitably, glycolaldehyde is present in a weight amount of 1-40, 4-15 or 10-15 times higher than pyruvaldehyde, for instance at least 5 times higher than pyruvaldehyde.

The aqueous solution may also contain acetol which may serve as sulfur scavenger. Accordingly, in yet another embodiment according to the present invention, in connection with any of the above or below embodiments, 0-10 wt %, such as 0.5-8 wt %, 0.5-5 wt % or 1-7 wt % of the organic dry matter content of the aqueous solution is acetol. Suitably, glycolaldehyde is present in a weight amount of 10-150, 20-100, times higher than acetol, for instance at least 50 times higher than acetol.

The aqueous solution may also contain glyoxal which may serve as sulfur scavenger. Accordingly, in yet another embodiment according to the present invention, in connection with any of the above or below embodiments, 0-10 wt %, such as 0-5 wt %, 0.5-8 wt %, 0.5-5 wt % or 1-7 wt % of the organic dry matter content of the aqueous solution is glyoxal. Suitably, glycolaldehyde is present in a weight amount of 10-150, 20-100, 2-40, 20-40 times higher than glyoxal, for instance at least 20, 25 or 30 times higher than glyoxal.

The sulfur compound of the process stream may be a mercaptan, COS or preferably hydrogen sulfide ($H_2S$) as the latter is present in many industrial applications. For instance, $H_2S$ present in oil and gas reserves originates from several sources including decomposition of organic material either thermally or by bacteria or from sea water injected during the extraction process to maintain pressure in the reservoir. $H_2S$ is also highly toxic, corrosive to drilling, extraction and transportation equipment, and poisonous to various downstream catalysts and is therefore removed from natural gas.

In another embodiment in connection with any of the above or below embodiments, the molar ratio of $H_2S$ in the process stream to glycolaldehyde in the aqueous solution is in the range 1:1-1:5, suitably 1:1.5-1:2.0. The best removal of $H_2S$ from a process stream is found at these particular ratios.

In another embodiment in connection with any of the above or below embodiments, the process stream is a fluid selected from the group consisting of natural gas, synthesis gas, LPG, crude oil, diesel, gasoline, jet fuel, kerosene, and water. In particular, the water may be wastewater used for increasing the pressure in wells to facilitate extraction.

It is well-known that absorption towers using regenerative sulfur scavengers are used to remove larger concentrations of $H_2S$. By the present invention, due to the provision of an aqueous solution i.e. as a liquid sulfur scavenger which is non-regenerative, the aqueous solution can be injected anywhere along a production line carrying the process stream where it is required to remove very small amounts of $H_2S$, for instance below 1-300 ppm. Hence, in another embodiment in connection with any of the above or below embodiments the contacting of the process stream with the aqueous solution comprises injecting the aqueous solution into wellheads, downholes and/or oil platforms, e.g. platform topside. Suitably, the aqueous solution may be further diluted with water prior to injecting it in order to facilitate the operation. The content of glycolaldehyde as organic dry matter will be unchanged.

Furthermore, by producing glycolaldehyde by fragmentation of carbohydrates such as thermolytic fragmentation (i.e. thermolysis) of sugars as for instance disclosed in WO2014/131743, and which is a simple process, the resulting aqueous solution (oxygenate mixture) can be used as a sulfur scavenger without any further treatment or conditioning. This way of producing the aqueous solution for use as sulfur scavenger not only enables the use of an environmentally friendly source (sugars), but also a higher yield of glycolaldehyde compared to other known methods based on pyrolysis of raw biomass.

Moreover, this enables the provision of a more inexpensive solution to the problem of removing sulfur compounds from process streams. While the market price of glycolaldehyde is significantly higher than glyoxal, the present invention enables the production of an aqueous solution (oxygenate mixture) containing glycolaldehyde as the predominant component which is more inexpensive than glycolaldehyde currently available on the market. More specifically, glycolaldehyde is conventionally produced via a route involving at least four major conversion steps, where ethane or naphtha are first converted to ethylene, ethylene is then converted to ethylene oxide which is subsequently converted to ethylene glycol and this finally is converted to glycolaldehyde. In contrast herewith, the oxygenate mixture of the present invention is a one-step conversion process in which a sugar such as glucose is converted to said oxygenate mixture.

Therefore, in another aspect of the invention, there is provided a method for producing the aqueous solution of any of the above embodiments comprising fragmentation of carbohydrates (such as a sugar) to produce a fragmentation product, preferably by thermolytic fragmentation (thermolysis or pyrolysis) of a sugar followed by a step of recovering the fragmentation product. Suitably this is conducted by thermolytic fragmentation of sugars at 400-600° C., such as 500-600° C. Suitably the sugar is selected from one or more of the group consisting of glucose, sucrose, fructose, xylose, mannose, arabinose, ribose, galactose, lactose, and combinations thereof.

In an embodiment according to the present invention, the carbohydrate, such as the sugar, is fed to the thermolytic fragmentation in an aqueous solution. The solvent may be water, or mixtures of water with other water miscible solvents, such as methanol and/or ethanol. Other solvents may also be used either in the fragmentation process or in the subsequent distillation process. If necessary such other solvents may be removed prior to using the aqueous solution as a sulfur scavenger.

The fragmentation product may be subjected to a purification step, such as a distillation, extraction, filtration or the like.

As mentioned above, the oxygenate mixture contains small amounts of glyoxal, and will only be a minor component (i.e. impurity). The oxygenate mixture may also contain small amounts of formaldehyde. The minor components may be removed or its level reduced, where necessary, by known methods as part of the purification. Even though purification is possible, the crude fragmentation product as such is useful as sulfur (e.g. $H_2S$) scavenger.

In an embodiment according to the present invention, the sulfur scavenger is obtainable by the method described herein. Such a sulfur scavenger will comprise:
10-99 wt % glycolaldehyde,
1-30 wt % pyruvaldehyde,
0-10 wt % acetol,
0-5 wt % glyoxal, and
0-25 wt % formaldehyde,
based on the organic dry matter content in the aqueous solution.

In cases where the acetol, glyoxal and/or formaldehyde has been reduced in a purification step, the amount of those components may be close to zero.

Such sulfur scavenger has the advantages of being environmentally friendly both with regard to preparation of the sulfur scavenger and use of the sulfur scavenger. In particular, the selection of raw materials and the processing equipment are environmentally friendly; and in the use of the fragmentation product as sulfur scavenger for injecting into wellheads, downholes and/or oil platforms, or a platform topside are environmentally friendly when using the crude fragmentation product, and in particular if the level of glyoxal and/or formaldehyde is reduced prior to use.

The sulfur scavenger according to the present invention, may be used for scavenging sulfur in a fluid selected from the group consisting of natural gas, synthesis gas, LPG, crude oil, diesel, gasoline, jet fuel, kerosene, and water.

EXAMPLE

Sodium sulfide nonahydrate is dissolved in water to give a concentration of hydrogen sulfide of 1500 ppm. The pH of the solution is adjusted to approx. 7 by the addition of hydrochloric acid. An amount of oxygenate mixture prepared as described in U.S. Pat. No. 7,094,932 with composition of organic dry matter: glyoxal: 5.5 wt %, pyruvaldehyde: 6.5 wt %, glycolaldehyde: 72.3 wt %, formaldehyde: 11.0 wt %, acetic acid: 1.45 wt %, acetol: 3.5 wt %, is added to the hydrogen sulfide solution giving a hydrogen sulfide to oxygenate molar ratio of 1:1.8. The mixture is allowed to stand for 19 hours at room temperature at which point the hydrogen sulfide concentration in the solution has been reduced to 700 ppm. In a blank experiment, identical to the above experiment except no oxygenate mixture was added, the hydrogen sulfide concentration was determined to be 1400 ppm after 19 hours.

The invention claimed is:
1. A method for removing sulfur compounds from a process stream comprising a step of contacting the process stream with an aqueous solution in which 10-99 wt % of organic dry matter content of the aqueous solution is glycolaldehyde, and 1-30 wt % of the organic dry matter content of the aqueous solution is pyruvaldehyde, wherein the aqueous solution does not contain oil.

2. The method according to claim 1, wherein 50-95 wt % of the organic dry matter content of the aqueous solution is glycolaldehyde.

3. The method according to claim 1, wherein glycolaldehyde is present in a weight amount of 1-40 times higher than pyruvaldehyde.

4. The method according to claim 1, wherein 0.5-5 wt % of the organic dry matter content of the aqueous solution is glyoxal.

5. The method according to claim 4, wherein glycolaldehyde is present in a weight amount of 2-40 times higher than glyoxal.

6. The method according to claim 1, wherein 0-25 wt % of the organic dry matter content of the aqueous solution is formaldehyde.

7. The method according to claim 1, wherein one of the sulfur compounds is hydrogen sulfide ($H_2S$).

8. The method according to claim 1, wherein the method further comprises a molar ratio of sulfur in the process stream to glycolaldehyde in the aqueous solution in a range of 1:1 to 1:5.

9. The method according to claim 1, wherein the process stream is a fluid selected from the group consisting of natural gas, synthesis gas, LPG, crude oil, diesel, gasoline, jet fuel, kerosene, and water.

10. The method according to claim 1, wherein the contacting of the process stream with the aqueous solution comprises injecting the aqueous solution into wellheads, downholes or oil platforms.

11. The method according to claim 1, wherein 0.5-10 wt % of the organic dry matter content of the aqueous solution is acetol, and wherein 0.5-10 wt % of the organic dry matter content of the aqueous solution is glyoxal.

12. The method according to claim 1, wherein the aqueous solution is free of formaldehyde.

13. A method for removing sulfur compounds from a process stream comprising a step of contacting the process stream with an aqueous solution in which 10-99 wt % of organic dry matter content of the aqueous solution is glycolaldehyde, and 1-30 wt % of the organic dry matter content of the aqueous solution is pyruvaldehyde, wherein 0.5-10 wt % of the organic dry matter content of the aqueous solution is acetol.

14. A method for removing sulfur compounds from a process stream comprising a step of contacting a process stream with an aqueous solution in which 10-99 wt % of organic dry matter content of the aqueous solution is glycolaldehyde, and 1-30 wt % of the organic dry matter content of the aqueous solution is pyruvaldehyde, wherein production of the aqueous solution comprises fragmentation of carbohydrates to produce a fragmentation product.

15. The method according to claim 14, wherein the carbohydrates comprise a sugar selected from the group consisting of glucose, sucrose, fructose, xylose, mannose, arabinose, ribose, galactose, lactose, tagatose, and combinations thereof.

16. The method according to claim 14, wherein the carbohydrates are fed to the fragmentation in an aqueous solution.

17. The method according to claim 14, wherein the fragmentation product is subjected to a purification step.

18. The method according to claim 17, wherein the purification step comprises removing formaldehyde from the aqueous solution.

19. The method according to claim 14, wherein fragmentation of the carbohydrates comprises thermolytic fragmentation.

20. A sulfur scavenger obtainable by creating an aqueous solution in which 10-99 wt % of organic dry matter content of the aqueous solution is glycolaldehyde and 1-30 wt % of the organic dry matter content of the aqueous solution is pyruvaldehyde,
- wherein production of the aqueous solution further comprises fragmentation of carbohydrates to produce a fragmentation product for use in the sulfur scavenger, and wherein the sulfur scavenger, based on the organic dry matter content of the aqueous solution, comprises:
- 10-99 wt % glycolaldehyde,
- 1-30 wt % pyruvaldehyde,
- 0-10 wt % acetol,
- 0-5 wt % glyoxal, and
- 0-25 wt % formaldehyde.

21. The sulfur scavenger according to claim 20, wherein the aqueous solution is free of formaldehyde.

22. A method of scavenging sulfur in a fluid, comprising creating an aqueous solution in which 10-99 wt % of organic dry matter content of the aqueous solution is glycolaldehyde and 1-30 wt % of the organic dry matter content of the aqueous solution is pyruvaldehyde,
- wherein production of the aqueous solution further comprises fragmentation of carbohydrates to produce a fragmentation product for use in a sulfur scavenger, and adding the sulfur scavenger to a fluid selected from the group consisting of natural gas, synthesis gas, LPG, crude oil, diesel, gasoline, jet fuel, kerosene, and water, wherein the sulfur scavenger comprises:
- 10-99 wt % glycolaldehyde,
- 1-30 wt % pyruvaldehyde,
- 0-10 wt % acetol,
- 0-5 wt % glyoxal, and
- 0-25 wt % formaldehyde.

23. A sulfur scavenger obtainable by, creating an aqueous solution in which 10-99 wt % of organic dry matter content of the aqueous solution is glycolaldehyde and 1-30 wt % of the organic dry matter content of the aqueous solution is pyruvaldehyde,
- wherein production of the aqueous solution further comprises fragmentation of carbohydrates to produce a fragmentation product for use in the sulfur scavenger, and wherein the sulfur scavenger, based on the organic dry matter content of the aqueous solution, comprises:
- 10-99 wt % glycolaldehyde,
- 1-30 wt % pyruvaldehyde,
- 0.5-10 wt % acetol,
- 0.5-10 wt % glyoxal, and
- 0-25 wt % formaldehyde.

* * * * *